Jan. 31, 1956     W. C. MASON     2,733,332
ELECTRIC STOVES
Filed Sept. 20, 1952
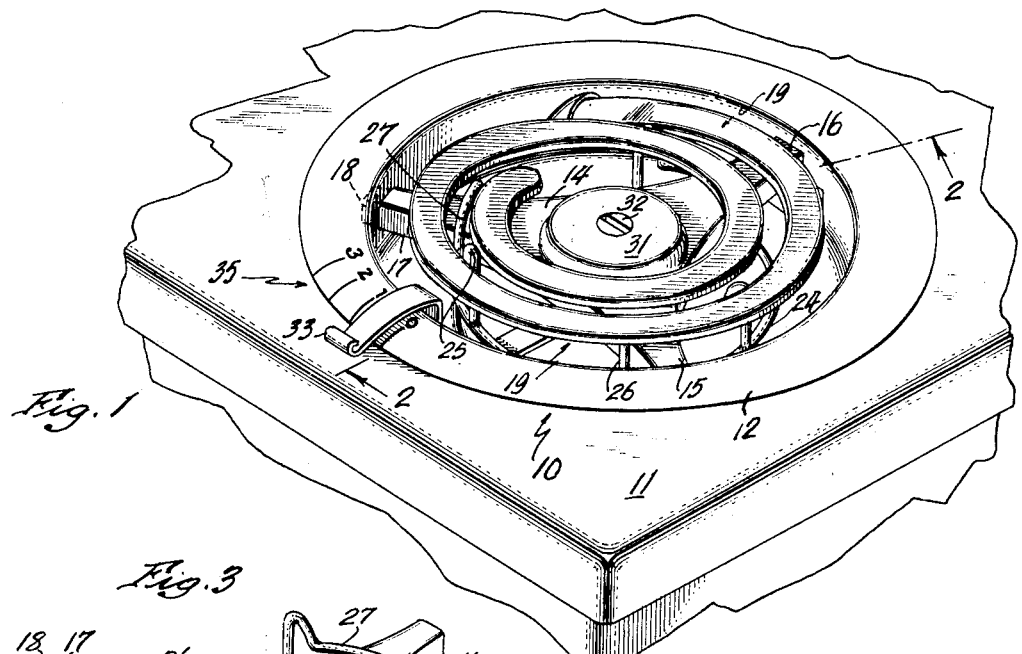
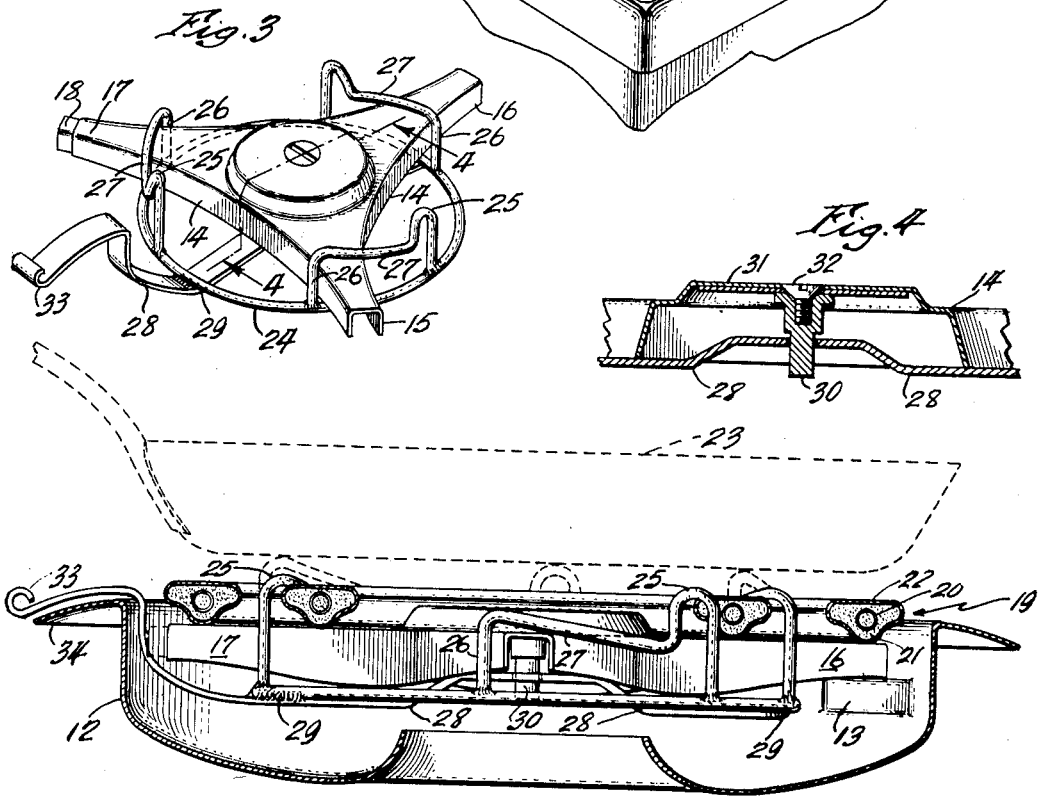
Inventor:
William C. Mason,
by Andros and Smith
His Attorneys.

United States Patent Office 2,733,332
Patented Jan. 31, 1956

2,733,332

ELECTRIC STOVES

William C. Mason, Slingerlands, N. Y.

Application September 20, 1952, Serial No. 310,669

3 Claims. (Cl. 219—37)

This invention relates to improvements in electric stoves. More particularly, it has to do with surface heating units for electric stoves of the general type that utilize an insulated, plane surfaced, spiral heating element and supporting means therefor, having particular reference to a device for use therewith adapted to support a cooking utensil preferably in one or more elevated positions above said heating element, to heat said utensil and contents by radiant or indirect heat by means of said element, and the provision of such a device, and combined arrangement of parts, is a principal object of the invention.

Modern electric kitchen ranges or stoves have been in use for many years and are accompanied by many advantages. Despite the many advantages, however, no practical device has even been made available to the public in connection with such stoves that will properly eliminate such disadvantages as scorching, burning and charring of foods due to direct contact of the cooking utensil with the intense heat generated by the heating elements. It has long been felt that it would be a distinct improvement to overcome such disadvantages and this has now been accomplished by means of the present invention. Furthermore, this improvement is accompanied by the further advantage that it provides intermediate heat control in addition to the limited control range already provided on such stoves.

Generally, therefore, it is also an object of the invention to provide a device that is simple, yet sturdy and durable of construction, economic of manufacture, and which will operate with relative freedom from wear and tear and other mechanical difficulties.

More specifically, it is an object of the invention to provide a surface heating unit for electric stoves comprising an insulated heating element for supporting and heating a cooking utensil in surface contact therewith, means adapted to support the heating element, and means, carried by the supporting means, progressively adjustable upwardly and downwardly to a pre-determined position above the heating element from a substantially flush position therewith to elevate the utensil to radiant heating position from a contact heating position of a heating element.

Another specific object of the invention is the provision for such a unit which includes as the means for holding the heating element, a spider, and a rotatable frame underlying the spider, upstanding projections on the frame extending above the spider and adapted to support a cooking utensil, camming bars overlying the spider and connecting the projections and the frame; and a control lever connected to the frame and being pivotally secured at one end to the spider, and extending outwardly thereof at its other end, whereby to cause the projections to rise and fall between a position flush with the heating element and a position elevated therefrom when the frame is rotated.

A further specific object is the provision of a device for use in conjunction with such a heating element comprising a frame having upstanding lugs thereon, adapted to support a cooking utensil, and camming elements connecting the lugs and the frame, whereby the lugs can be raised from a substantially flush position with the heating element to an elevated position with respect thereto, to enable the utensil to be heated by radiant heat only, when the utensil is out of contact with the heating element.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawing, in which:

Fig. 1 is a perspective view of one embodiment of the invention illustrated as being mounted in a kitchen range or stove, a corner fragmentary portion only of which is illustrated;

Fig. 2 is a transverse sectional view taken along the lines 2—2 of Fig. 1 and looking in the direction of the arrows, except that the device has been rotated to illustrate a cooking utensil held in elevated position above the heating element;

Fig. 3 is a perspective view of the elevating device mounted to operate in conjunction with a supporting member for the heating element; and Fig. 4 is a transverse sectional view, somewhat enlarged, taken along the lines 4—4 of Fig. 3.

Referring more particularly to the drawing, there is illustrated at 10 a surface heating unit mounted in a well or opening provided therefor at the top of a modern type of electric kitchen range or stove 11.

The unit comprises a heat reflecting drip pan 12 having shoulders 13 therein to support, for example, a spider 14. Two of such shoulders are sufficient in the embodiment shown to support, for example, the arms 15 and 16 of the spider, the other arm 17 having an extension 18 thereon adapted to fit into a suitable opening in the side of the pan 12.

A heating element of the so-called Calrod type, such as that indicated generally at 19 is carried by the spider 14. Such heating elements are well known. Briefly, they comprise an electric heating wire 20, surrounded by an electric insulating material 21, which in turn is surrounded by a metal sheath 22 that consequently becomes heated to incandescence when the resistance heating wire 20 is heated. Such heating elements are characterized by being formed generally in a plane surfaced spiral as illustrated, for example, in the drawing. The conventional control switches for heating such elements are adapted to be regulated to at least three places namely, high, medium, low, and, of course, off positions. However, in all cases there is a direct contact between the heating element and the cooking utensil and sometimes, because of this direct contact with the intense heat generated by the heating element, regardless of the position of the control switch, food may easily become scorched, burned or charred.

In order to overcome these disadvantages, as well as to create a greater range of intermediate heat control, I have provided a device to be used in combination with such a unit whereby the cooking utensil can be held in pre-determined or selected elevated position closely adjacent the heating element so that the contents within the utensil will be heated by radiated and reflected heat, out of direct contact with the heating element 19, as shown by the dotted line position of the utensil 23 in Fig. 2. The spaced relation between this utensil and the heating element 19 may be regarded as somewhat exaggerated for illustrative purposes, although with my device the same can be constructed actually to raise the utensil to such a height, or to intermediate heights, back to a position where the utensil can be brought again into direct contact with the heating element.

Preferably I employ a device such as that herein illustrated with this particular embodiment of heating unit. Since all drip and reflecting pans need some kind of a holder for the heating element, a spider type of element is usually employed.

My device utilizes a substantially circular rotatable frame 24 preferably adapted to underlie the spider. The frame has secured thereto upstanding lugs or projections 25 which are adapted to support such a utensil and it is obvious that at least three of such projections should be used. Spaced from each of these upstanding projections are somewhat smaller legs or projections 26 and these are connected to the projections 25 by inclined camming bars 27 overlying the arms of the spider. The projections preferably are disposed between the turns of the spiral heating element.

The frame preferably is rotated manually and in the embodiment shown I employ a hand control lever 28 suitably connected to the frame, for example, by welding as at 29. The inner end is pivotally secured to the center of the spider on a pivot pin 30 secured in position to the top 31 of the spider by a flat head screw 32. The outer or free end 33 of the lever 28 projects beyond the spider and over the lip 34 of the pan 12. The latter preferably has graduated indicia indicated at 35 marginally around its periphery for ready reference to the intermediate positions of the lugs or projections 25. At the zero position the projections 25 will be flush, or substantially flush, with the heating element 19. If the lever 28 is moved through the 1, 2, and 3 positions the camming bars 27 will ride the tops of the spider arms, thereby elevating the projections through a range of positions substantially to that shown in Fig. 2 of the drawing.

It will thus be seen that objects therein set forth may readily and efficiently be attained and since certain changes may be made in the above device and different embodiments of the inventions could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. In a surface heating unit for electric stoves, the improvement comprising in combination an insulated plane surfaced spiral heating element to support and heat a cooking utensil in surface contact therewith; a spider to support said heating element, a rotatable circular frame underlying said spider, upstanding projections on said frame extending above said spider to support a cooking utensil, camming bars overlying said spider and connecting said projections and said frame; and a control lever connected to said frame and being pivotally secured at one end to said spider, and extending outwardly of said heating element at its other end; to cause said projections to rise and fall between a position flush with said heating element and a position elevated therefrom when said frame is rotated.

2. In a surface heating unit for electric stoves, having an insulated plane surfaced spiral heating element to support and heat a cooking utensil in surface contact therewith, the improvement comprising, in combination, a spider to support said heating element; a rotatable circular frame underlying said spider; upstanding projections on said frame extending above said spider to support a cooking utensil; camming bars overlying said spider and connecting said projections and said frame; and a control lever connected to said frame and being pivotally secured at one end to said spider, and extending outwardly of said heating element at its other end, to cause said projections to rise and fall between a position flush with said heating element and a position elevated therefrom when said frame is rotated.

3. In a surface heating unit for electric stoves, having an insulated plane surfaced spiral heating element to support and heat a cooking utensil in surface contact therewith, and a spider to support said heating element, the improvement comprising a rotatable circular frame to underlie said spider; upstanding projections on said frame to extend above said spider to support a cooking utensil; camming bars to overlie said spider and connecting said projections and said frame; and a control lever connected to said frame, having one free end extending centrally thereof pivotally to be secured to said spider, and extending outwardly and upwardly of said frame at its other end to lie in spaced relation from said heating element, to cause said projections to rise and fall between a position flush with said heating element and a position elevated therefrom when said frame is rotated.

References Cited in the file of this patent

UNITED STATES PATENTS

| 150,088 | Searle | Apr. 21, 1874 |
| 2,257,580 | Trompeter | Sept. 30, 1941 |
| 2,442,659 | McCormick | June 1, 1948 |
| 2,497,258 | Chesser et al. | Feb. 14, 1950 |
| 2,615,118 | Kelly | Oct. 21, 1952 |

FOREIGN PATENTS

| 162,514 | Austria | Mar. 10, 1949 |
| 437,923 | Great Britain | Nov. 7, 1935 |